United States Patent

[11] 3,622,446

[72] Inventor Paul D. Burnham
  Waterville, Maine
[21] Appl. No. 889,091
[22] Filed Dec. 30, 1969
[45] Patented Nov. 23, 1971
[73] Assignee Keyes Fibre Company
  Waterville, Maine
  Continuation-in-part of application Ser. No. 701,895, Jan. 31, 1968, now abandoned. This application Dec. 30, 1969, Ser. No. 889,091

[54] METHOD OF MAKING A POCKET-TYPE FILTER AND PRODUCT
16 Claims, 8 Drawing Figs.

[52] U.S. Cl. .................................................. 162/146, 55/418, 55/482, 55/524, 55/528, 156/62.2, 161/150, 162/218, 162/227, 210/505
[51] Int. Cl. .................................................. D21h 5/12
[50] Field of Search .......................................... 162/145, 146, 218, 227, 228, 231; 55/418, 482, 524, 528; 210/505, 508; 161/150; 156/62.2

[56] References Cited
UNITED STATES PATENTS

| | | | |
|---|---|---|---|
| 2,802,405 | 8/1957 | Krogel | 162/231 X |
| 2,928,765 | 3/1960 | Kurjan | 55/528 X |
| 2,933,154 | 4/1960 | Lauterbach | 55/528 X |
| 3,028,911 | 4/1962 | De Lear | 162/227 X |
| 3,158,532 | 11/1964 | Pall et al. | 162/145 X |
| 3,306,815 | 2/1967 | Mayne | 162/228 X |
| 3,386,231 | 6/1968 | Nutting | 162/146 X |
| 3,442,757 | 5/1969 | Williams | 162/227 X |

Primary Examiner—S. Leon Bashore
Assistant Examiner—Richard H. Anderson
Attorney—Connolly and Hutz ABSTRACT: An aqueous slurry is prepared which contains no substantial amount of phenol thermoset resin but has up to 30 percent wood pulp; 20–65 percent by weight of either olefin, acrylic, modacrylic, or vinylchloride-vinyl acetate copolymer fibers; and a balance of either rayon, polyester, polyamide, fiberglass, asbestos or a mixture of any two or more. Flame retardants may also be added. The slurry is suction molded to produce a pocket-shaped filter for removing contaminants from streams of gas.

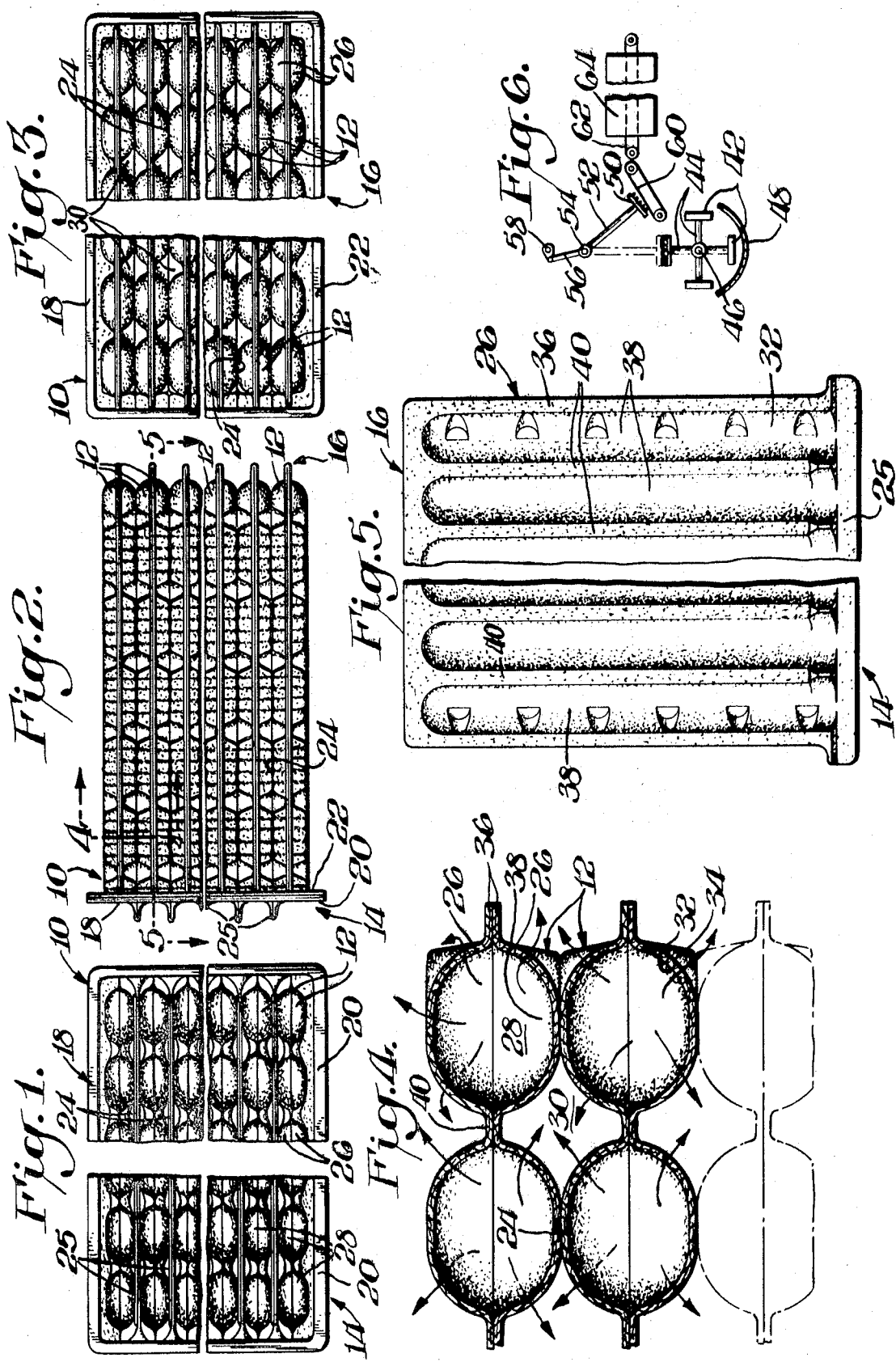

METHOD OF MAKING A POCKET-TYPE FILTER AND PRODUCT

CROSS-REFERENCE TO RELATED APPLICATIONS

This is a continuation-in-part of U.S. application Ser. No. 701,895 filed Jan. 31, 1968, now abandoned.

BACKGROUND OF THE INVENTION

The claimed invention relates to the field of articles molded by the suction deposition of fibrous pulp materials from an aqueous slurry against screen-covered, open-face forming dies, and particularly to improved techniques for molding components for the assembly of large disposable bag- or pocket-type filters useful for removing contaminants from fluid streams.

Prior to the present invention, large pocket or bag type filter units of various shapes and constructions have been known, such as the ones illustrated in Rivers U.S. Pat. No. 2,853,154, Hagendoorn U.S. Pat. No. 3,099,547 and Hogg U.S. Pat. No. 3,124,440. Such filters have heretofore been formed from flat sheets of flexible filtering material which is formed to the desired contoured configuration by pleating, creasing, folding and other shaping techniques. The shaping of the sections which go to make up the filter unit is an expensive and time consuming operation which must be figured as an addition to the initial cost of the flexible sheet material. Since the filter units of this nature are preferably disposable, the initial cost factor can spell the difference between commercial success and failure.

In the past, it has been proposed to directly mold filtering units from fibrous material, as in Anderson U.S. Pat. No. 2,539,767. This procedure involves the well-known suction deposition of such pulp material from an aqueous slurry against an open-face forming die. The fibrous material accumulates on the face of the die in matted, interfelted fashion which, upon removal from the die and drying, constitutes a continuous sheet directly molded to virtually any desired shape. Such molded fibrous units, however, have certain drawbacks in that the strength and flammability of such material has been considered inadequate for large bag- or pocket-type filters of the type referred to above. If the fibrous pulp material chosen is of the type and density which is known to produce stronger molded articles, perhaps with the addition of resins or other strengthening binders, the porosity of the resultant molded product is insufficient to provide proper air flow of the requisite commercial efficiency. Binder resins such as phenol thermoset type resins in amounts of 15 to 25 percent on the weight of the fibers, as suggested in Nutting U.S. Pat. No. 3,386,231, have recently been experimented with in molding large bag- or pocket-type filters of the type in question, but they have proved unsatisfactory because they are extremely difficult to render flame resistant and they have a propensity to deposit on the fibers in large chunks which adversely effects the airflow characteristics of the finished product. If, on the other hand, extremely large bag- or pocket-type filters are directly molded by the suction process from materials and with density characteristics adequate to provide for the required airflow, the resultant structure heretofore has had insufficient strength and flame resistance to be acceptable for commercial use.

In attempting to solve the longstanding problem and provide a large bag- or pocket-type filter directly molded by the suction process to the desired shape, conventionally moldable fibrous materials have proved inappropriate. Speculations concerning different natural and synthetic materials which might be useful for nonwoven filtering units are available, such as in Lauterbach U.S. Pat. No. 2,933,154 and Pall U.S. Pat. No. 3,158,532, but many of such suggested materials are wholly inappropriate to molding by the suction deposition process. Such random suggestions of numerous materials thus amount to no more than an invitation to experiment with the materials but provide no useful clue concerning the proper combinations of materials for the successful molding of large bag- or pocket-type filters by the aqueous slurry suction process.

The problems encountered in providing the desired disposable filter involve two critical balances in addition to low cost. First, the filtering characteristics of the material must be balanced against the strength of the material, as noted above. Second, the filtering characteristics of the unit involve a critical balance between the air flow capacity on the one hand and the contaminant collecting capacity on the other hand.

Thus, the long-recognized problem which has remained unsolved until the advent of the present invention is the provision of a large bag- or pocket-type filter with the heretofore irreconcilable properties of requisite strength and desirable filtering characteristics directly molded from a novel combination of materials by the suction deposition process into serviceable, disposable filtering units.

SUMMARY OF THE INVENTION

In accordance with the present invention, there is provided a suction molded filter unit for filtering contaminants from streams of gas, and a method for manufacturing the unit, which involves preparing an extremely thin aqueous slurry preferably having less than 0.4 percent by weight of primarily synthetic fibrous material. The fibrous material includes no more than about 30.0 percent by weight of wood pulp, a large amount of at least one member of the group consisting of olefin, acrylic and modacrylic fibers and fibers of a copolymer of vinyl chloride and vinyl acetate, and a balance comprising fibers of rayon, a polyester, a polyamide, fiberglass or asbestos or a mixture thereof. A layer of the fibrous material is formed by suction against an open-face forming die contoured to define the shape of the filter unit, and the layer of fibrous material is transferred from the forming die to the dryer conveyor by means of a matingly contoured transfer die. The forming die comprises a slotted die construction with a screen covering, whereas the transfer die comprises a slotted die construction without a screen covering.

BRIEF DESCRIPTION OF THE DRAWINGS

Numerous advantages of the present invention will become apparent to one skilled in the art from a reading of the detailed description in conjunction with the accompanying drawings wherein similar reference characters refer to similar parts, and in which:

FIG. 1 is a front or upstream elevational view of an assembled filter unit according to this invention;

FIG. 2 is a side elevational view of the filter unit of FIG. 1;

FIG. 3 is a rear or downstream elevational view of the filter unit of FIG. 1;

FIG. 4 is a fragmentary enlarged sectional elevational view on line 4—4 of FIG. 2;

FIG. 5 is a plan view of a single molded unit from line 5—5 of FIG. 2;

FIG. 6 is a diagrammatic illustration of a machine on which the filter unit of FIG. 1 may be molded;

DETAILED DESCRIPTION OF THE INVENTION

Figure 7:
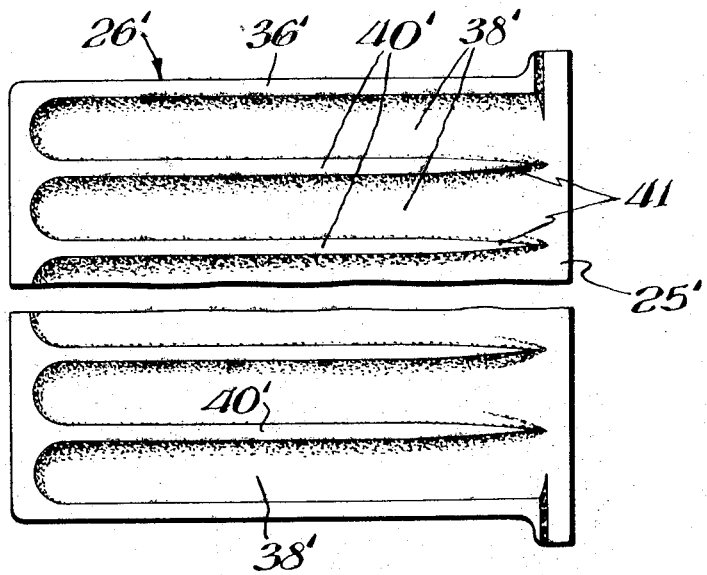
FIG. 7 is a plan view of a single molded unit which differs from that of FIGS. 1–5.

Referring in more particularity to the drawing, there is shown in FIGS. 1–3 a replaceable unit 10 for filtering contaminants from streams of gas. The unit comprises a series of pocket forming layers 12 superimposed one upon another in layered fashion. The replaceable unit conveniently has a width dimension and a height dimension which are approximately identical, whereby the front and rear ends of the unit are square. The length and other dimensions of the unit may vary in wide ranges depending upon the filtering environment in which it is to operate.

The front end 14 may conveniently be referred to as the upstream end of the unit, while the rear end 16 may conveniently be referred to as the downstream end of the unit. The layered pocket forming sections are attached together and to a framework 18 at the upstream end of the unit, and they retain their properly assembled relation at the downstream end of the unit without additional attaching means. The framework 18 conveniently may comprise a front member 20 and a rear member 22, both being of open rectangular configuration. Marginal portions of the upstream end of the filtering units are folded outwardly and clamped between the frame members 20, 22 and the frame members secured to the filtering layers in this manner by contact cement or other suitable adhering means. When the replaceable unit is assembled in this fashion, it may be installed in suitable existing openings connected with the air stream from which contaminants are to be filtered. AS is known, when one filtering unit 10 has completed its life service, it may simply be removed and discarded and a new replaceable unit 10 substituted in the air stream.

In addition to securing the various pocket forming layers 12 together by means of the framework 18, each of the various layers may be secured to its adjacent layer as at 24. This may conveniently be accomplished by providing protruding lip or flange portions 25 which extend laterally across the entire upstream face of each layer. When the layers are assembled to complete the final product 10, the flanges 25 of adjacent layers may be secured together by heat sealing or other appropriate adhering means. Such heat sealing with the combination of materials discussed below is a function of heat, pressure and time well known to those skilled in the art. In a suggested replaceable unit 10, there may be 15 of the layers 12, each layer having a series of pockets formed therein.

Each layer 12 is comprised of two subassembly halves 26, heat sealed together to provide the series of elongated pockets 28 which are open at the upstream end 14 of the final unit and closed at the downstream end 16 of the final unit. As is well understood in the filtering arts, the air stream in which the filtering unit is placed enters the pockets 28 at the open end and is forced through the filtering material along the full length of the pockets. In the assembled unit, the spacing 30 between the pockets provides a channel into which the filtered air may flow and freely escape from the downstream end 16 of the unit. Since each half 26 of each layer 12 is identical, a detailed description of only one such half is necessary.

Each subassembly half 26 thus includes an upstream side 32 and a downstream side 34. Viewing one of the subassemblies 26 from the upstream side, as in FIG. 5, the unit has along its forward edge the aforementioned lip or flange 25. In approximately the same plane as the lip 25, but offset slightly therefrom, is a secondary flange 36 which surrounds the remaining three sides of the subassembly. When two such subassemblies are positioned with their upstream sides 32 face to face, the surrounding flanges 36 make planar contact so that the two subassemblies may be secured together by heat sealing or other means to form one of the pocket layers 12. Each subassembly 26 further includes a series of elongated depressions or valleys 38 which are open at the upstream end and closed at the downstream end. When two subassemblies are secured together to form a layer 12, the opposed valleys 38 form the aforementioned elongated pockets 28. The adjacent valleys 38 in each subassembly 26 are separated by parallel ribs 40 having elongated flat tops which are coplanar with the surrounding flange 36. As can be appreciated, when two subassemblies are secured together, the rib tops 40 may be sealed together along with the surrounding flanges 36 to insure that the individual pockets are isolated from each other.

Figure 8:
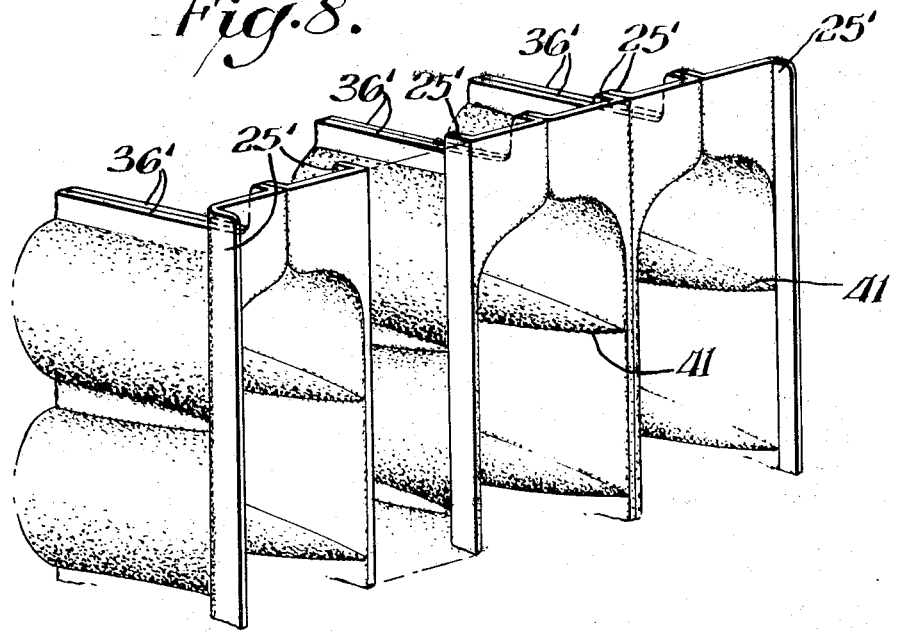
FIG. 8 is an enlarged exploded perspective view of several of the units of FIG. 7 assembled together to provide a filter unit which differs from that of FIGS. 1–3.

Referring to FIGS. 7 and 8, a subassembly 26' is disclosed which has certain advantages over that described immediately above. The subassembly half 26' in FIG. 7 differs in minor but important respects from the subassembly half 26 illustrated in FIG. 5. In the FIG. 5 embodiment, the mouth portion of the filter pockets have a common integral supporting portion member of the same material as the sheets, surrounding and extending transversely therefrom to support the filter pockets in preselected cantilever extending position to receive a fluid stream to be filtered. It is now believed that these transversely extending wall portions between the mouth portions of adjacent pockets are unnecessary for supporting purposes, and they also create a buffeting effect which reduces the effectiveness of fluid flow into pockets. This problem is corrected by the design in FIG. 7 where the parallel ribs 40', which separate adjacent pocket-forming valleys 38', are streamlined and tapered as at 41 to merge smoothly into the flat plane of the forward edge lip or flange 25'. The outermost extent of the merging rib ends 41 are spaced the width of the flange 25' from the edge of the sheet. In addition, when the subassembly halves 26 of FIG. 5 are assembled into units, the flanges 25 which are joined in faced relation define longitudinally extending strengthening rib means between rows of pockets, as shown in FIGS. 1 and 2, defining inlet fluid guide channels communicating with the mouths of the rows of side-by-side filter pockets. This feature is also corrected with the subassembly half 26' of FIG.7 when assembled with an identical subassembly half as illustrated in FIG. 8. In assembly, the flanges 25' are folded back to lie in a downstream direction—rather than their "as-molded" upstream direction—and joined in back-to-back faced relation. This eliminates the rib means which otherwise would extend longitudinally beyond the upstream extremity of the streamlined portion 41 of the ribs 40', eliminating the possibility that a longitudinally extending rib could bend sideways and partially obstruct an entire row of pocket mouths.

Each subassembly 26 may be directly molded to shape against open-face suction dies. The dies may be incorporated on conventional pulp molding machinery, such as that illustrated in FIG. 6 and in the left-hand portion of the drawing in Randall U.S. Pat. No. 2,704,493. Such machinery is of the intermittent rotating type in which foraminous female forming dies 42, mounted on hollow radial arms 44, are rotated step by step by a shaft 46 through a pulp tank 48 for the suction formation of molded articles on the dies. At each pause of the rotation of the shaft 46, a formed article is removed from a forming die by means of a male transfer die 50 mounted on a hollow arm 52 carried by a shaft 54. The open-face forming dies 42 and the transfer die 50 are provided with conventional air and vacuum connections for forming and transferring the articles.

The shaft 54 is operated from an eccentric 56 fastened on a continuously rotating drive shaft 58, whereby the shaft 54 and its transfer die 50 are reciprocated toward and away from the forming dies 42 in time to the step by step rotation of the dies. As each forming die is paused in registration with the transfer die, the transfer die moves toward the forming die to accomplish transfer of the formed article to the transfer die, after which the transfer die is swung laterally, by any suitable cam or the like (not shown) to discharge the formed article onto a conveyor 60 which carries it to another conveyor 62 operating within an open drier 64 of conventional construction. The formed articles may be supported in any suitable manner on the conveyor 62, preferably by resting on the flat surface without constricting drying dies or other arrangements.

The forming dies 42 useful according to this invention preferably comprise what is commonly known in the molded pulp art as a screen-covered slotted die. Such die construction is described in detail in Chaplin U.S. Pat. No. 2,829,568. In the die according to this invention, however, approximately 80 percent of the exposed forming area consists of screen supporting lands between the slots, and the slots extend in parallel fashion across the open forming face of the die preferably parallel with the longer sides of the rectangular forming area of the die. Suction is applied through rearward openings connecting with the base of the slots, and the suction is distributed by the screen over the entire forming face of the die. The large percentage of screen which is exposed to the slots enables a large volume of fluid to pass through the die to enable the combination of materials which comprise the pulp slurry, discussed in more detail below, to deposit a suitable layer of fibrous material on the screen face of the die.

The transfer die 50 may comprise what is known in the molded pulp art as a slotted die, that is one without a screen covering. Such a die is illustrated in Manson U.S. Pat. No. 2,273,055. This comprises a slotted member wherein the lands between the slots make direct contact with the layer of fibrous material which is transferred to this die from the forming die. Suction is applied through rearward openings connecting with the base of the slots, and the die has approximately 95 percent of its exposed article contacting area composed of lands between the slots. The transfer die useful in connection with this invention need not be equipped with heating means, as the pressing and transfer is done rapidly at room temperature, as discussed below.

The pulp slurry according to this invention comprises an aqueous slurry containing up to 0.4 percent by weight of an intimate admixture or solids content, and preferably the fibrous material amounts to only approximately 0.05 percent of the weight of the slurry. The slurry is prepared by first blending approximately 2 percent by weight of the fibrous material with approximately 98 percent of water, and thereafter adding water to the blend to acquire the desired aqueous slurry containing less than 0.4 percent by weight of fibrous material. In preparing the blend, the wood pulp discussed below is preferably first mixed with the water, the hydrophobic fibers discussed below are next blended in, and the ingredients such as rayon which blend in easily are added last. Thereafter, before the additional water is added to attain the desired density, a flame retarder may be added depending upon the ultimate use of the final filter product, as well as approximately 1 percent by weight cationic starch to improve the bonding of the fibrous material and 1.5 percent alum to reduce the pH to insure that the flame retarder acts properly on the fibrous material. The flame retarder presently found satisfactory—and which has useful bonding properties as well—may be added to the slurry in amounts up to 50 percent or more on the weight of the fibrous material after the rayon and before the starch, and this advisably comprises, in approximately equal parts, a thermoplastic (not thermosetting) resinous copolymer of vinylidene chloride, and antimony trioxide pigment in an approximately 50—50 water suspension, such as "Vi-Tard" available from National Starch Chemical Corporation.

The combination of ingredients may vary within the parameters outlined below depending upon the particular filtering duties for which the product is intended. The preferred combination of ingredients for the fibrous material includes up to 30.0 percent by weight of wood pulp, and in one example preferably about 20 percent by weight. A suitable wood pulp is bleached softwood kraft, a conventional papermaking ingredient having adequate fiber length, although equivalent fibers having recognized fibrillation qualities to promote interfelting, such as asbestos, may be substituted for the wood pulp if desired. The wood pulp is a very inexpensive ingredient and is easily wettable which facilitates moldability. Moreover, the wood pulp because of the small fibers improves the dust catching ability for the fines or small particles, but large amounts of wood pulp over 30 percent by weight correspondingly reduce the air flow capacity of the final filter.

The preferred fibrous pulp material also includes 20–65 percent by weight of olefin, acrylic and modacrylic fibers covering a wide range, as well as fibers of a copolymer of vinyl chloride and vinyl acetate. In one example preferably about 30 percent by weight of a copolymer of vinyl chloride and vinyl acetate is used. The latter generally contains at least about 80 percent by weight of copolymerized vinyl chloride. Although all such copolymers are suitable for the purpose of the present invention, it is generally preferred to employ a copolymer containing at least 85 percent by weight of copolymerized vinyl chloride. "Vinyon" is a typical commercially available vinyl chloride-vinyl acetate copolymer which has proved to be quite satisfactory for use in the present invention. This copolymer is understood to contain 88–90 percent by weight of copolymerized vinyl chloride. This material is obtainable commercially in fibrous form having a fiber length of approximately one-fourth a diameter of less than about 100 microns, and in one example approximately 15–20 microns. This material is fireproof and has the valuable property of being heat sealable so that the subassemblies 26 may be secured together to form the layers 12 of which the unit 10 is comprised. Less than about 20 percent of this material thus results in a product which has inferior heat sealing capabilities and requires additional measures to achieve flameproof qualities. While more than 65 percent of this material may be utilized, more than 20 percent—such as 30 percent—of wood pulp should be utilized in such cases to insure moldability.

The mixture of fibrous material also includes a balance comprising fibers of rayon, a polyester such as polyethylene teraphthalate, a polyamide, fiberglass or asbestos or a mixture thereof. Preferably this may include 10–40 percent by weight of fibers of rayon and 10–40 percent by weight of fibers of polyethylene teraphthalate. Most specifically, as one example suitable filters have been made which include about 30 percent by weight of fibers of rayon having a length of up to approximately three-eighths inch wherein a minor portion of the fibers have a diameter of approximately 15–20 microns and a major portion have a diameter of approximately 27–32 microns, and about 20 percent by weight of fibers of polyethylene teraphthalate wherein the fibers have a length of approximately three-eighths inch and a diameter of approximately 15–20 microns, although diameters of up to 100 microns are contemplated. The rayon is preferred because it is one of the lower cost materials which is commercially available with good diameter selectability for controlling the porosity of the final product. But since rayon is flammable, large amounts thereof require additional flame retardent. The polyethylene teraphthalate has excellent dust-holding abilities in the final product, but is expensive so that large amounts of this ingredient are to be avoided except for filters where the contaminant-catching requirements are sufficiently high to justify the cost of this ingredient.

While the above-specified ingredients, and the particular ratios thereof, are suitable for general filtering purposes, the following combination of ingredients has particular utility where fire is a hazard. To produce a filter having high resistance to flame, and the important ability to burn with a minimum amount of dark smoke, an aqueous slurry is first prepared containing from about 0.05 to about 0.10 percent by weight of fibrous material. The fibrous material includes about 10 percent by weight of wood pulp, about 35 percent by weight of fibers of a copolymer of vinyl chloride and vinyl acetate, about 40 percent by weight of fibers of fiberglass, and about 15 percent by weight of fibers of polyethylene teraphthalate. To this combination of ingredients, there is next added approximately 1.0 percent by weight on the fibrous material of finely divided asbestos particles to act as a charge to attract the flame retardant added next. About 30 percent by weight on the fibrous material of a thermoplastic resinous copolymer of vinylidene chloride, and antimony trioxide pigment in an approximately 50—50 water suspension is included as a flame retardant. Approximately 1–1½ percent by weight on the fibrous material of cationic starch to improve the bonding of the fibrous material, 2.0 percent by weight on the fibrous material of alum to reduce the pH to insure that the flame retardant acts properly on the fibrous material, and approximately 1¼ percent by weight on the fibrous material of dry powder soda ash to reduce acidity and aid in retaining the ammonium polyphosphate—added next—on the fibrous material, are then added. Finally, approximately 20 percent by weight on the fibrous material of what is believed to be an ammonium polyphosphate, such as "Phos-Chek" P/30 available from Monsanto Company is added. Comparing the fire resistant combination of ingredients disclosed immediately above with the combination of ingredients for general purposes disclosed earlier, it will be noted that the substitution of fiberglass for rayon improves flame resistance, and the addition of the "Phos-Chek" P/30 is believed to reduce smoking, probably inhibits the spread of flame, and possibly minimizes the blackness of color in whatever smoke there is.

Successful filters have been manufactured according to this invention in the following manner. First, the pulp slurry including the fibrous pulp materials of the types and in the quantities described above is prepared according to the procedure outlined above. This pulp slurry is delivered to the pond 48 and contained there in the conventional manner. The above described screen-covered slotted forming die 42 is immersed in the aqueous slurry and suction or vacuum at a value of from about 5 to 20 inches Hg is applied for approximately one to ten seconds. Due to the unusually large (20 percent) percentage of the slotted die face which is exposed to the suction, large amounts of fluid are drawn through the screen resulting the deposition of fibrous material upon the screen. For instance, for a subassembly half 26 of generally rectangular overall shape approximately 22×12 inches, approximately 25 gallons of fluid pass through the die 42 at 20 inches Hg suction in a 6-second forming time.

The forming die with the layer of fibrous material thereon is then removed from the slurry and moved into position for engagement with the transfer die 50. The layer of fibrous material on the face of the forming die at this stage is composed of approximately one part fibrous material to four parts water. Thereafter, the matingly contoured transfer die 50 is brought into contact with the layer of fibrous material on the forming die, and lightly pressed thereagainst at room temperature for a short time such as several seconds or less. Suction or vacuum at a value of approximately 5 to 20 inches Hg is then applied to the transfer die, and the suction applied to the forming die is shut off and air pressure applied in the known fashion to effect transfer of the layer of molded fibrous material from the forming die to the transfer die. The transfer die thereafter moves into position above the dryer conveyor 60 and transfers the layer of molded fibrous material by replacing suction with pressure in the known manner to effect release of the layer from the transfer die to the dryer conveyor.

The filter unit subassembly 26 is then conveyed through the drying tunnel 64 in the known fashion. Preferably, for one example with about 50 percent by weight of wettable fibers, the drying takes place for 5–20 minutes at an oven temperature of approximately 200°–300° F. During the drying process, the article attains a drying temperature of about 240°–250° F. which is in the softening range but below the melting point of the copolymer of vinyl chloride and vinyl acetate. This insures that this ingredient effects a slight bonding which is believed to increase the strength of the final article to some extent. When the article reaches the exit end of the drying tunnel 64 it is ready to be assembled with another such unit in inverted fashion to form a pocket section 12 for eventual assembly in the replaceable filter unit 10.

Filtering units manufactured in the above described manner have proved highly satisfactory in actual use. The strength of the filtering material is more than adequate even for the large area of material involved with pocket or bag filters of this nature. The airflow capabilities are easily balanced against the dust-trapping capabilities of the filtering material, and these two requirements are determined by the fiber types, diameters and lengths. For some applications, it is desirable to have higher airflow capabilities and lower dust trapping capabilities, and the ingredients of the fibrous material may be combined according to the above teachings to achieve the following requirements having desirable airflow and dust trapping capabilities throughout a wide range.

Moreover, with filters made according to this invention, the air flow capabilities are maintained at the desired high level even though the replaceable unit experiences considerable clogging after long use. This is believed to be attributable to the fact that the downstream side 34 of the article is the screen side of the article; that is, the side of the article which is in contact with the forming die 42 during the molding operation. The upstream side 32 of the article is thus "fuzzier" and less compact due to the manner in which the water is drawn through the article during the molding operation. When placed in use as a filter, the upstream side of the article is thus "fuzzier" than the downstream side, and this materially improves the anticlogging characteristics of the filter according to this invention.

Since the forming die 44 includes a series of parallel slots beneath the screen forming member, the final article includes parallel strips of fibrous material which are more dense in the locations which were above the slots during the molding operation and less dense in the areas which were above the lands of the molding die. In the finished article, the dense ribs increase the strength of the article and the less dense ribs which alternate therewith provide increased airflow capabilities. With the filtering unit of the area mentioned above, the porosity and strength values are balanced so that airflow of approximately 10,000 cubic feet per minute and higher are possible. At this flow rate, to give but one illustrative example, standard test dust comprised of approximately 70 percent by weight carbon black and 3 percent by weight cotton linters and 27 percent by weight Arizona road dust is filtered from an air stream in amounts of 10 grams per 2 square feet at 0.08–0.16 inches of $H_2O$ pressure drop and at 67 cubic feet per minute of room temperature air.

While the above described embodiments constitute preferred modes of practicing this invention, other embodiments and equivalents may be resorted to within the scope of the actual invention, which is claimed as:

1. A method of molding a subassembly for incorporation in a replaceable unit for filtering contaminants from streams of gas comprising the steps of
   a. preparing an aqueous slurry containing up to 0.4 percent by weight of a mixture of fibrous material having no substantial amount of phenol thermoset resin effective as a binder and including
      i. up to 30.0 percent by weight of wood pulp,
      ii. 20–65 percent by weight of at least one member of the group consisting of olefin, acrylic and modacrylic fibers and fibers of a copolymer of vinylchloride and vinyl acetate, and
      iii. a balance comprising fibers of rayon, a polyester, a polyamide, fiberglass or asbestos or a mixture of any two or more thereof,
   b. immersing an open-face forming die contoured to define the filter unit subassembly in the aqueous slurry and
   c. applying suction through the forming die to deposit a layer of the fibrous material thereon,
   d. removing the forming die from the aqueous slurry with the layer of fibrous material thereon,
   e. pressing the layer against the contoured forming die by means of a matingly contoured transfer die and
   f. applying suction through the transfer die to remove the layer of fibrous material from the forming die,
   g. releasing the layer from the transfer die, and
   h. drying the layer to attain a molded filter unit subassembly.

2. The method of molding a filter unit subassembly as in claim 1 wherein the mixture of fibrous material in the slurry comprises 2–30 percent by weight of wood pulp, 25–50 percent by weight of fibers of a copolymer of vinyl chloride and vinyl acetate, 10–40 percent by weight of fibers of rayon and 10–40 percent by weight of fibers of polyethylene teraphthalate.

3. The method of molding a filter unit subassembly as in claim 2 wherein the mixture of fibrous material is approximately 0.05 percent of the weight of the aqueous slurry, and the mixture of fibrous material includes about 20 percent by weight of wood pulp, about 30 percent by weight of fibers of a copolymer of vinyl chloride and vinyl acetate, about 30 percent by weight of fibers of rayon, and about 20 percent by weight of fibers of polyethylene teraphthalate, and the material has added thereto a flame retardant.

4. The method of molding a filter unit subassembly as in claim 2 wherein the mixture of fibrous material is less than approximately 0.10 percent of the weight of the aqueous slurry, and the mixture of fibrous material includes about 10 percent by weight of wood pulp, about 35 percent by weight of fibers of a copolymer of vinyl chloride and vinyl acetate, about 40 percent by weight of fibers of fiberglass and about 15 percent by weight of fibers of polyethylene teraphthalate, and the material has added thereto a flame retardant.

5. The method of molding a filter unit subassembly as in claim 2 wherein the mixture of fibrous material includes as wood pulp bleached softwood kraft, the majority of the fibers of the copolymer of vinyl chloride and vinyl acetate have a length of approximately one-quarter inch and a diameter of approximately 15–20 microns, the fibers of rayon have a length of up to approximately three-eighths inch and a minor portion thereof have a diameter of approximately 15–20 microns and a major portion thereof have a diameter of approximately 27–32 microns, and the majority of the fibers of polyethylene teraphthalate have a length of approximately three-eighths inch and a diameter of approximately 15–20 microns.

6. The method of molding a filter unit subassembly as in claim 1 wherein the aqueous slurry is prepared by first blending approximately 2 percent by weight of the mixture of fibrous material with approximately 98 percent by weight water, and thereafter adding water to the blend to attain the desired aqueous slurry containing up to 0.4 percent by weight of fibrous material.

7. The method of molding a filter unit subassembly as in claim 1 wherein the contoured open-face forming die comprises a slotted support member covered with screen on which the layer of fibrous material is deposited, and suction is applied through rearward openings connecting with the base of the slots, and the matingly contoured transfer die comprises a slotted member wherein the lands between the slots make direct contact with the layer of fibrous material.

8. The method of molding a filter unit subassembly as in claim 7 wherein the open-face forming die has approximately 80 percent of its exposed forming area consisting of screen-supporting lands between the slots, and the matingly contoured transfer die has approximately 95 percent of its exposed article-contacting area composed of lands between the slots.

9. The method of molding a filter unit subassembly as in claim 7 wherein the open-face forming die is immersed in the aqueous slurry and suction at a value of approximately 5 to 20 inches Hg is applied for approximately 1 to 10 seconds, and the contoured forming die thereafter lightly presses the layer of fibrous material against the forming die for approximately 1 second at room temperature prior to removing the layer from the forming die.

10. The method of molding a filter unit subassembly as in claim 2 wherein the layer of fibrous material is free dried on a substantially planar surface without constricting dies at a temperature in the softening range but below the melting point of the copolymer of vinyl chloride and vinyl acetate.

11. An aqueous slurry having a solids content of up to 0.4 percent by weight having no substantial amount of phenol thermoset resin effective as a binder and comprising up to 30 percent by weight of wood pulp, 20–65 percent by weight of at least one member of the group consisting of olefin, acrylic and modacrylic fibers and fibers of a copolymer of vinyl chloride and vinyl acetate, and a balance comprising at least one member of the group consisting of rayon fibers, polyethylene teraphthalate fibers, fiberglass and asbestos fibers.

12. A suction molded fibrous mat having no substantial amount of phenol thermoset resin effective as a binder and comprising an intimate admixture of up to 30 percent by weight of wood pulp, 20–65 percent by weight of at least one member of the group consisting of olefin, acrylic and modacrylic fibers and fibers of a copolymer of vinyl chloride and vinyl acetate, and a balance comprising at least one member of the group consisting of rayon fibers, polyethylene teraphthalate fibers, fiberglass and asbestos fibers, the fibers of said mat having an average diameter smaller than about 100 microns and an average length of from about one-eighth inch to about one-half inch.

13. The suction molded fibrous mat as in claim 12 wherein the balance includes rayon fibers and polyethylene teraphthalate fibers.

14. The suction molded fibrous mat as in claim 13 wherein the intimate admixture includes about 20 percent by weight of wood pulp, about 30 percent by weight of fibers of a copolymer of vinyl chloride and vinyl acetate, about 30 percent by weight of fibers of rayon, and about 20 percent by weight of fibers of polyethylene teraphthalate.

15. The suction molded fibrous mat as in claim 12 wherein the intimate admixture includes about 10 percent by weight of wood pulp, about 35 percent by weight of fibers of a copolymer of vinyl chloride and vinyl acetate, about 40 percent by weight of fibers of fiberglass, and about 15 percent by weight of fibers of polyethylene teraphthalate.

16. The suction molded fibrous mat as in claim 12 wherein the wood pulp is bleached softwood kraft, the majority of the fibers of the copolymer of vinyl chloride and vinyl acetate have a length of approximately one-quarter inch and a diameter of approximately 15–20 microns, the fibers of rayon have a length of up to approximately three-eighths inch and a minor portion thereof have a diameter of approximately 15–20 microns and a major portion thereof have a diameter of approximately 27–32 microns, and the majority of the fibers of polyethylene teraphthalate have a length of approximately three-eighths inch and a diameter of approximately 15–20 microns.

* * * * *